(12) United States Patent
Kalmar

(10) Patent No.: US 6,376,941 B1
(45) Date of Patent: Apr. 23, 2002

(54) HIGH FREQUENCY LINEAR-FORCE ELECTRIC MOTOR

(76) Inventor: Julian R. Kalmar, 4712 Admiralty Way, Ste. 223, Marina Del Rey, CA (US) 90292

( * ) Notice: Subject to any disclaimer, the term of this patent is extended or adjusted under 35 U.S.C. 154(b) by 0 days.

(21) Appl. No.: 09/660,734

(22) Filed: Sep. 13, 2000

Related U.S. Application Data (60) Provisional application No. 60/153,648, filed on Sep. 13, 1999.

(51) Int. Cl.[7] ............................................. H02K 41/00
(52) U.S. Cl. ........................................ 310/36; 310/25
(58) Field of Search ............................. 310/15, 17, 25, 310/36, 37, 38

(56) References Cited

U.S. PATENT DOCUMENTS 5,197,279 A    3/1993   Taylor ...................... 60/203.1
5,520,356 A  * 5/1996   Ensley ......................... 244/62
5,831,354 A  * 11/1998  Stopplecamp ................ 310/12

OTHER PUBLICATIONS

"Recipe for a Flying Saucer" (1 page) George J. Bugh Jul. 1999.

* cited by examiner

Primary Examiner—Nestor Ramirez
Assistant Examiner—Judson H. Jones
(74) Attorney, Agent, or Firm—Oppenheimer, Wolff & Donnelly (57) ABSTRACT

A linear-force motor contains no moving parts and is powered by a high frequency generator. It is silent and vibration-free. It has no emissions except force and heat. It is not restricted to operating on a fixed track. No mechanical maintenance or lubrication is required. It can be completely sealed and therefore operate in extreme environments without degradation. A variation of this design can produce rotary motion.

19 Claims, 10 Drawing Sheets

Legend
○ Propeller wire
● Exciter antenna

HIGH FREQUENCY LINEAR-FORCE ELECTRIC MOTOR

RELATED APPLICATION

This application claims priority from U.S. Provisional Patent Application Ser. No. 60/153,648, filed Sep. 13, 1999. The contents of this application is incorporated by reference herein.

BACKGROUND OF THE INVENTION

This invention relates to motors. In particular it relates to generating a motive force for forcing or moving objects in a desired manner.

Existing motors require maintenance in terms of lubrication and component replacements because their means of transmitting mechanical work is by the use of moving parts which slide against each other. This causes wear and requires lubricants to minimize friction between the sliding surfaces. Many lubricants used for this purpose are toxic. Additionally, existing motors or motive means can be unduly noisy and vibrate. Further, since most motors produce turning motion they need additional mechanical devices to translate the turning motion into linear motion for those applications requiring it. These "interface" components such as gears, pulleys, converters and drive trains in general, also require maintenance and lubrication. These interface components can add a lot of bulk and weight to the motive means which reduces overall efficiency for mobile applications. Existing motors cannot be completely sealed since the means of conveying useful mechanical work is derived from directly coupled moving parts. The dirt which gets inside is a source of undue wear. Existing motors can produce strong magnetic fields which are not compatible with some environments and special design accommodations must be made because of this deficiency. Finally, existing motors can create hazardous conditions because of exposed moving parts. Many serious injuries have resulted from people getting caught and mangled in these moving parts.

Clearly, there is a need to provide a novel method, system and product for generating motive force.

PRIOR ART

Very few references exist in this arena. Prior U.S. Pat. No. 5,197,279 utilizes the time-retarded field emitted by one electromagnet to push upon another magnet. It uses pulsed magnetic fields. However, it is substantially different in nature to my invention because that patent describes a system constructed from pulsed electromagnets which attract and repel each other. This is not the principle of my invention. Further, the prior patent requires an elaborate control system, probably computer-based, which my invention does not require. The only other reference which has been found, was published on the internet on Jul. 20, 1999 by George Bugh as a means of making a "flying saucer". Although the subject of flying saucers generally lacks credibility, it is cited here. A printout of this internet reference is filed in the accompanying Information Disclosure Statement. It proposes two metallic plates, essentially a capacitor made from two half-shells (possibly metallic dinner plates), coming together at the edges to form a cavity and looking somewhat like fictional depictions of UFO's (unidentified flying objects) or flying saucers. To these top and bottom metallic plates is attached a wire from a radio frequency generator such that the instantaneous voltages at the center of each plate are 90 degrees apart in phase. Since the plates are separated by a quarter of a wavelength in space, by the time the radiated electric fields from each plate reach the other plate, the following effect occurs. The upper plate is pushed up by electrostatic repulsion and the lower plate is pulled up by electrostatic attraction. As the radio frequency cycle continues, the effect is that the electric fields continue to push and pull in substantially the same direction. If this proposal actually functions, it is substantially different in operation from my invention because the proposal is based on electrostatic attraction and repulsion. Contrarily, my invention uses different magnetic effects to produce a motive force.

SUMMARY OF THE INVENTION

According to the invention there is provided a means for generating a motive force without the use of moving parts. A sealed electromagnetic resonant cavity, excited by one of several methods, resonates and generates strong standing waves within the cavity. A fixed structure (called a "propellor"), inside the cavity, located at or near a magnetic maxima of the standing wave, is powered and passes a high level of alternating electric current. The interaction of the cavity's strong standing magnetic wave and the current passing through the propellor causes a magnetic Lorentz force to be produced on the propellor.

This is the motive force of the system, method and product of the invention.

Since the propellor is physically fixed to the cavity, any force on the propellor is transmitted to the cavity by direct physical contact. The cavity, as a whole then, is forced to move according to the direction of the generated force. To perform useful mechanical work, the cavity, which forms the body of the motor, is simply mounted on the object which must be moved. Direct physical contact of the cavity and the object to be moved is the means of conveying the force and thus when the object moves according to the force from the motor, useful mechanical work is performed.

The electromagnetic waves can be of any frequency (or wavelength) from extremely low radio frequency waves through to the microwave frequencies and even higher beyond that; infrared, visible light, ultraviolet, x-rays, etc. can be used to power this invention.

The invention is directed to means of directly converting electromagnetic, namely radio wave, energy into mechanical motion without using any moving parts. Essentially the system includes a type of transducer.

The invention is further described with reference to the accompanying drawings and description.

BRIEF DESCRIPTION OF THE DRAWINGS

FIG. 5 is a representation of a non-planar, 3-dimensional motor having complementary pairs of non-planar resonant cavities used together or separately to be a 3-dimensional force producer. A single motor produces forces in any of the three dimensions in either direction. The outline is of two resonant cavity structures which may be used singly or in pairs. At each corner is placed a 45 degree angled reflector to reflect the electromagnetic waves down the next adjacent leg of the resonant cavity. Each leg of the structure is approximately one wavelength long. Inside the structure along each leg could be placed propellor wires at the respective half-wave points. At the respective quarter and three-quarter wave points could be placed the exciter antennas, however, only one exciter is required for each 6-legged motor structure. Multiple propellor wires could be required if complete 3-degree freedom of motion with rotations is needed.

DETAILED DESCRIPTION OF THE PREFERRED EMBODIMENT

A high frequency linear-force electric motor (FIG. 10) includes a resonant cavity designed to be one wavelength long when excited by a supplied radio frequency signal. Since a resonant cavity has an infinite number of excitation modes, the motor's cavity is designed for a particular excitation mode and a particular frequency such that the resonant cavity is one wavelength long in the desired cavity mode. Cavity modes are specified with respect to the geometry of the cavity. For the cylindrical cavity shown, an example mode would be $TE_{112}$; the "2" indicates that the cavity is two half-wavelengths long.

Figure 10:
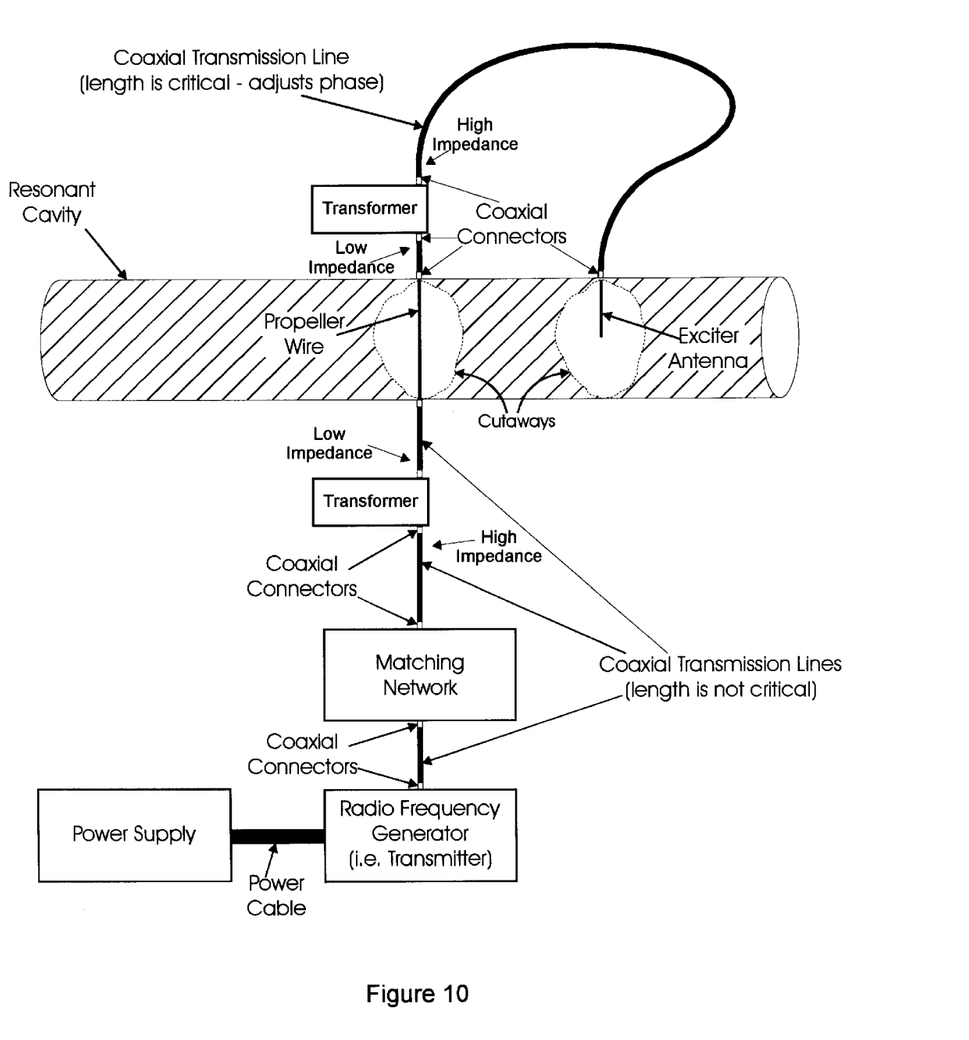
FIG. 10 is a variation of FIG. 3 showing the use of high-frequency transformers to increase the current flow through the propellor wire, and thus increase the magnetic field produced by the propellor wire.

With reference to FIG. 10, the excitation energy is supplied from a radio frequency generator (possibly a commercial radio transmitter) via coaxial transmission lines, a matching network and an optional transformer. The purpose of the transmission lines is to convey the radio frequency energy. The purpose of the matching network is to attempt to maximize the energy transfer out of the radio frequency generator. The optional transformers at each end of the propellor wire can be used to increase the current flow through the propellor by altering the impedance of the supplied energy from the matching network such that the propellor wire passes a very large radio frequency current at low voltage. This helps to maximize the force produced by the motor. The length of the coaxial transmission lines between the radio frequency generator and the cavity are not critical in terms of length except that the longer they are, the more energy is attenuated in the lines themselves. So, shorter is better.

The propellor wire conveys the radio frequency energy through the cavity on its way to the exciter antenna. The propellor wire therefore has a radio frequency current traveling through it. It is this current which, in the presence of the magnetic standing wave signal set up by the exciter antenna, will cause a Lorentz force to be produced on the propellor wire. The higher the current, the greater the force. The location of the propellor is preferably at or near a magnetic field maxima in the cavity's standing wave. This position is preferably also the same position as the electric field minima so that little or preferably no electric induction is produced in the propellor wire by the electric standing wave of the cavity. The propellor is therefore located in a region of oscillating magnetic field with little or preferably no electric field fluctuations.

The optional transformer between the propellor wire and the exciter antenna alters the impedance of the radio frequency energy so as to convey a preferably maximum energy to the exciter antenna and thus into the cavity. The location of the exciter is preferably at or near an electric field maxima of the cavity's standing wave. This location is preferably also the location of a magnetic field minima in the cavity's standing wave. So the exciter antenna is in a region of oscillating electric field and little or preferably no magnetic field.

The combined length of the coaxial transmission lines between the propellor wire and the optional transformer and from the optional transformer to the exciter is critical. The length must be adjusted so that the peak propellor wire current occurs preferably at or very near the peak magnetic standing wave set up in the cavity by the exciter antenna. Since cutting and trying various lengths of transmission line is tedious, a variable phase shifter may be used to adjust the phasing of the propellor current relative to the cavity's magnetic standing wave. Note that there are two possible maximum relationships between the peak magnetic standing wave and the propellor wire current. These correspond to the possible directions of the current flow in the propellor wire. Changing from a peak current in one direction—call it positive—to a peak current in the other direction—call it negative—reverses the direction of the force produced by the motor.

Although the radio frequency generator, matching network and optional transformers are all shown as distinct and separate units, they may all be part of one device attached around the cavity, or any combination of units as might be dictated by a good engineering design, or by other constraints set up as part of the marketing of the product, etc.

The orientation of the exciter antenna and the propellor wire is dictated by the cavity geometry and excitation mode.

FIG. 10 is not intended to imply that the only configuration of propellor and exciter are driven in this manner. The propellor and exciter may be driven by completely independent generators and amplifiers and a separate means of phase control may be required.

Here is a brief description of some of the motor components in the preferred embodiment with reference to FIG. 10:
1. The propellor is a structurally strong wire spanning at least a portion of the diameter of the resonant cavity. It should bear essentially the full force developed by this motor.
2. The propellor (wire) preferably passes diametrically through the resonant cavity at the halfwave point, and terminates at the center conductor of coaxial cable connectors mounted diametrically opposite each other, through the cavity walls, for the purpose of mounting the propellor wire.

3. The propellor preferably does not touch the cavity walls, but is insulated from the cavity by the coaxial cable connectors, although other variations do exist.
4. The propellor is a conductor which provides an electrical passage-way through the resonant cavity for alternating current flow to the exciter.
5. Connected to one of the propellor wire's coaxial connectors is a length of coaxial transmission line which terminates at the matching network after passing through the optional transformer, which provides a high, preferably maximal, coupling of the generator energy to the resonant cavity. The length of this coaxial transmission line is not critical.
6. Connected to the other of the propellor wire's coaxial connectors is another length of coaxial transmission line and an optional impedance transformer which ultimately terminates at the exciter antenna. The length of this coaxial transmission line is important because it determines the phase relationship of the maximum propellor current to the maximum magnetic field standing wave produced by the exciter antenna. It is therefore adjusted in length as previously described to preferably maximize force production.
7. It is possible to mount the exciter antenna from the top or bottom of the cavity.
8. The effect of radio-frequency excitation of the resonant cavity by the generator is the same as previously described. The phase relationship of the exciter field on the current through the propellor wire is such that a force is produced by the propellor wire is substantially in the same direction as described next.

Producing the Force

The uni-directional force production is now described.

If the current reverses direction every half cycle of radio frequency energy, doesn't that also reverse the direction of the force every half cycle? The answer is that if the magnetic field of the standing wave were always in the same direction, the force would indeed reverse in direction every half cycle and no net macroscopic force would be observed. However, since both the current in the propellor wire and the direction of the magnetic field in the standing wave BOTH reverse every half cycle, the direction of the force is substantially the same. The force is produced in pulses every half cycle, and so, if the radio frequency energy is supplied as a pure sine wave, the force is produced in pulses at the rate of twice the radio frequency energy supplied by the generator.

With reference to FIG. 10, it is assumed that the cavity resonating mode is such that the magnetic field surrounding the propellor wire is perpendicular to the wire and in fact is oriented such that it comes out of and goes into the page every cycle. When the magnetic field is at its peak value around the propellor, either going in, or coming out of the page, and when the motor is properly tuned for maximum force production, there is a maximum current through the propellor wire. Since the propellor wire current and the magnetic field of the standing wave in the cavity are at right angles, a force is produced in the direction of being along the length of the cavity. Depending upon the orientation of the propellor current, either up or down, the propellor and cavity will be pushed left or right. During the second half of the radio frequency cycle, the propellor current and the magnetic field of the cavity's standing wave are both reversed and the force is again in the same direction along the length of the cavity.

This force on the propellor wire is conveyed by contact to the cavity. When the cavity is attached to an object which must be moved, the object moves. As long as the cavity and object are permitted to move, useful mechanical work is done. If the cavity is not free to move, this is akin to holding the shaft of a conventional electric motor in a vise. No useful mechanical work is done, and the motor simply heats up. If the motor is permitted to move, the distance traveled multiplied by the force produced by the motor is the useful mechanical work.

Some Variations of the Preferred Embodiment

The size and operating frequency of such a motor are in inverse relation to each other. A motor for powering a ship might be a hundred or more meters in length and operate at approximately 1,000,000 hertz if the cavity is air filled. However, a motor of the same size could be operated at perhaps 10,000 hertz if a dielectric material with a very high permittivity filled the cavity. At the other extreme a cavity could be constructed of nano-technological structures of perhaps 10–100 nanometers in length and use a corresponding frequency range of $10^{16}$ hertz. Arrays of millions of such tiny motors can be embedded in silicon or other crystalline structures and fabricated into panels. Even smaller motors are possible, operating at even higher frequencies, using regular arrays of atoms in carefully grown crystals. Metalic atoms in regular periodic crystalline formations serve as the requisite propellor structures. Optical or other electrical excitation techniques are employed and the polished surfaces of the crystal, coated or polished, serve as the reflecting surfaces of a resonant cavity. These cavity resonators are many wavelengths long.

The power sources do not necessarily need to be directly connected to such motors. For instance, it is possible that for tiny motors powered by microwave or light radiation, the motors could contain power reception mechanisms (antenna or solar cells) which would feed the motor. Microwave or laser energy could be beamed at the motor's power receptor which might then be converted to the motor's resonant frequency and applied to the motor. The radiation may even be at the motor's resonant frequency so no power conversion is needed. Since movement in particular directions is controlled by motors operating at different frequencies, multiple motors are coupled together into a micro-robot and powered externally by application of various amplitudes of the required electromagnetic frequencies beamed at the robot.

Dielectric materials other than air or vacuum can significantly lower the resonant frequency of the cavity. It is possible for instance to lower the operating frequency of a resonant cavity by introducing a dielectric with a very high relative dielectric constant (say 1,000,000) by a factor of 1000; the frequency falling as the square-root of the relative dielectric constant. This tends to produce cavities that are very short for a given resonant frequency and lends itself to producing flat panel motors. However, the selection of high dielectric constant materials is rather restricted at present because the dielectrics of high permittivity (dielectric constant) quite often have high loss tangents (losses) and this would make these motors very inefficient. There are a nearly infinite number of media which can be used inside the resonant cavity.

The cavity and propellor structures can be made of any materials. A conventional resonant cavity may be constructed from highly conductive material such as copper, gold, or silver. However, the cavity can also be made from superconducting materials such as high grade niobium. The motor efficiency is improved in proportion to the conductivity of the material. It is also possible to construct a motor from two different dielectric materials with different indices of refraction. The boundary between the two dielectrics serves as a mirror; using the physical principle of "total internal reflection".

The operating temperature of this kind of motor is very broad. It may be used near absolute zero if superconducting cavity materials require low temperatures. At the other extreme, providing the materials are designed to operate at high temperature, several thousand degrees is the upper temperature limit. However, the most efficient operating temperature is at the cooler temperatures. In fact, since this type of motor can be completely sealed, it is possible to completely immerse the motor in a cooling bath without risk of damaging the motor.

Alternately, the cavity walls and propellor and exciter structures can be designed with cooling passages through them; coolant can be pumped through them.

Figure 4:
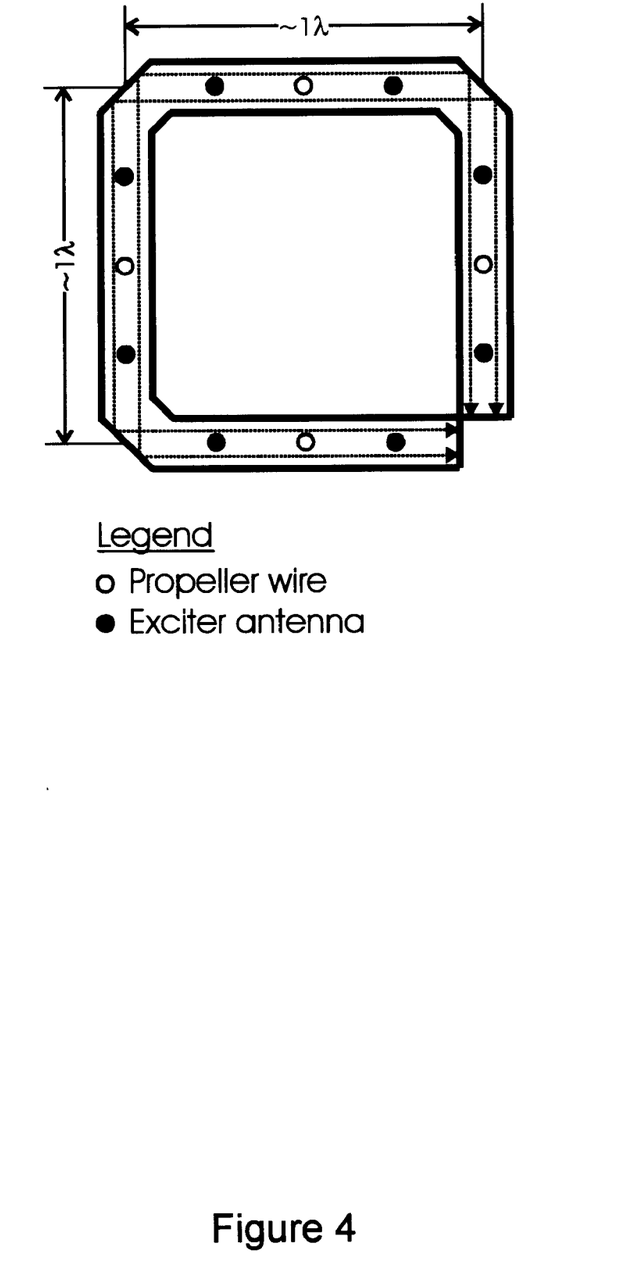
FIG. 4 is an alternative resonant cavity, namely a square-like donut-like shape with 45-degree angled reflectors at the corners, showing a 2-dimensional propulsion motor resonant cavity schematic. The square resonant cavity (top view) shows possible propellor and Exciter positions. This configuration allows planar motion including rotation by controlling which propellers are energized. Phasing is critical.
Figure 5:
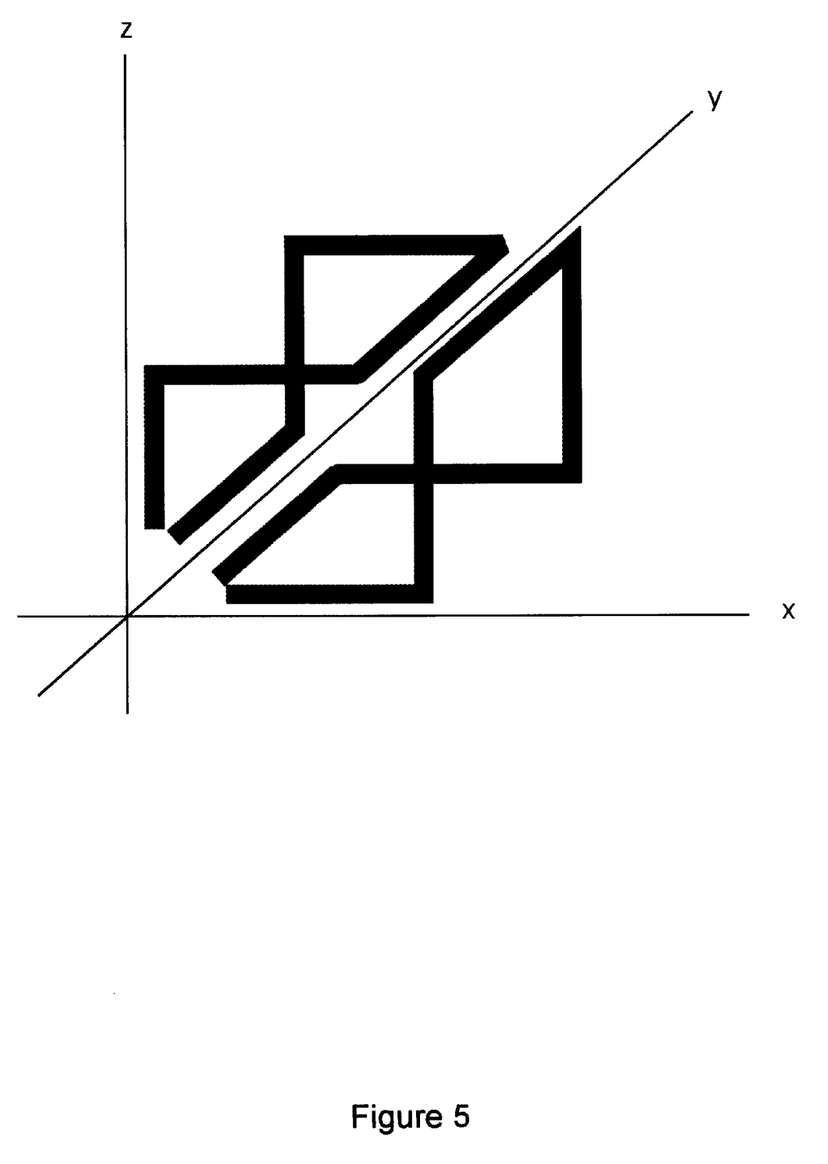

The physical geometry of the cavity offers an infinite number of design possibilities. Simple cavities are typically of round or rectangular cross-section. However, alternatives and additions may have square, elliptical, or many other cross-sectional geometries. Various of these geometries can be used in combination or vary from one shape to another in a design of this type of motor. Certainly, the diameter may be varied as well as the cross-sectional geometry to engineer the resonant cavity with desirable qualities. There are no limits to the geometry as long as good resonator design techniques are used. Very unorthodox designs are possible. The length of the cavity doesn't have to be one wavelength long at the operating frequency. It can be multiple wavelengths long, or even a partial number of wavelengths long. Cavities also do not have to be linear, they can be folded into planar or even 3-dimensional geometries using angled reflecting surfaces to guide the reflection of the electromagnetic waves inside the cavity. These types of cavities are illustrated schematically in FIGS. 4 and 5 and can be used to force the motor in any planar direction (per FIG. 4) or any 3-dimensional direction (per FIG. 5). Rotations can be produced by cavities with single or multiple propellors such that the propellor(s) are not at the center of mass. Pairs of propellors could work to cause rotation when powered with oppositely currents, or in a single direction when powered with currents in the same direction, or vise versa according to the design.

The geometry of the propellor structures is not limited to simple straight wire sections. Another common geometry is a wire loop. The design of propellor geometry is based producing substantially maximum force, and that depends upon the shape of the magnetic field structures in the cavity. The propellor geometry is any shape necessary to capitalize on the cavity magnetic fields. There can of course be multiple propellor structures either in parallel at or near a magnetic maxima in the cavity's standing wave, or, if multiple magnetic maximas are present in the cavity, one or more propellor's can be placed at each maxima to maximize the motive force.

Many cavity excitation methods are possible. Although the example in the preferred embodiment shows an exciter antenna as a straight wire, a loop or any other geometry of exciter structure is possible. The requirement is that the electromagnetic energy is efficiently coupled into the resonant cavity causing the cavity to be primarily, preferably maximally, excited in the desired cavity excitation mode. It is also possible to use aperture coupling techniques, where no actual exciter antenna is present in the cavity at all. Instead, a hole or slot is cut into some portion of the cavity resonator to feed the electromagnetic energy in from an electromagnetic energy source. It is also possible to use multiple excitation methods and multiple excitation structures or apertures. Any available state-of-the-art method or combination of methods of cavity excitation may be used. An infinite number of methods exist.

There are an infinite number of cavity resonance modes which may be used. These modes are designated for round and rectangular cavities by such nomenclature as $TE_{102}$, $TM_{114}$, etc. Further information can be found in, for instance, microwave design literature. This motor does not rely on the availability of a particular excitation mode, but can be designed for use with any resonance mode. Unconventional resonator designs may not have particular mode designations, but that does not take away from the idea that any mode may be used.

Figure 6:
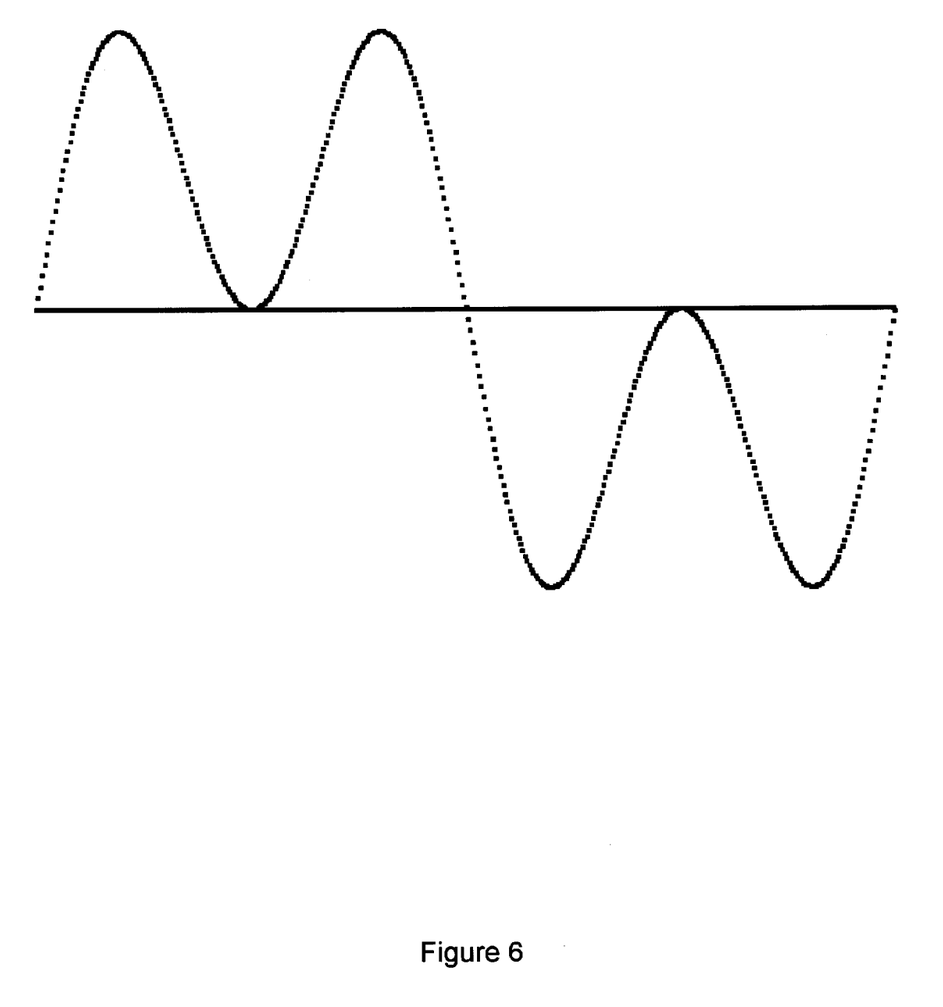
FIG. 6 is an example of a non-sinusoidal waveform possibility constructed from properly phased, equal amplitude first and third harmonic sinusoidal waveforms summed together.
Figure 7:
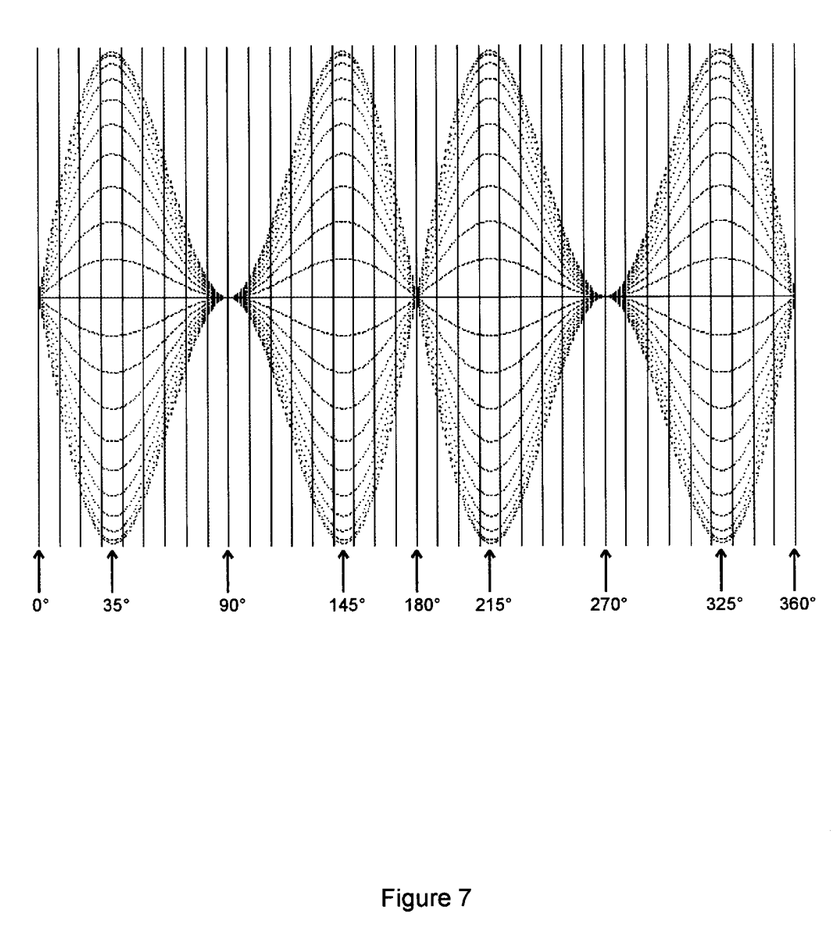
FIG. 7 is the electric standing wave pattern produced by the waveform of FIG. 6 when resonating in a one wavelength (of the fundamental frequency) long resonant cavity.
Figure 8:
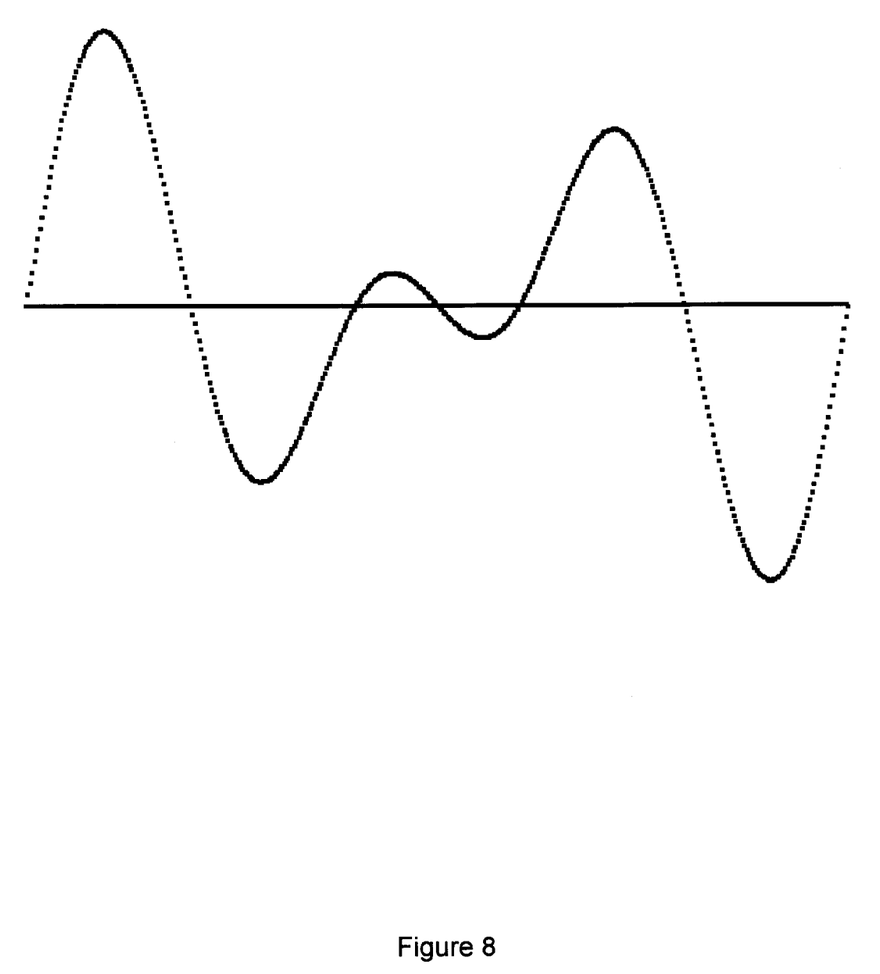
FIG. 8 is an example of a non-sinusoidal waveform possibility constructed from properly phased, equal amplitude frequencies of ratio 2 to 3 locked in phase.
Figure 9:
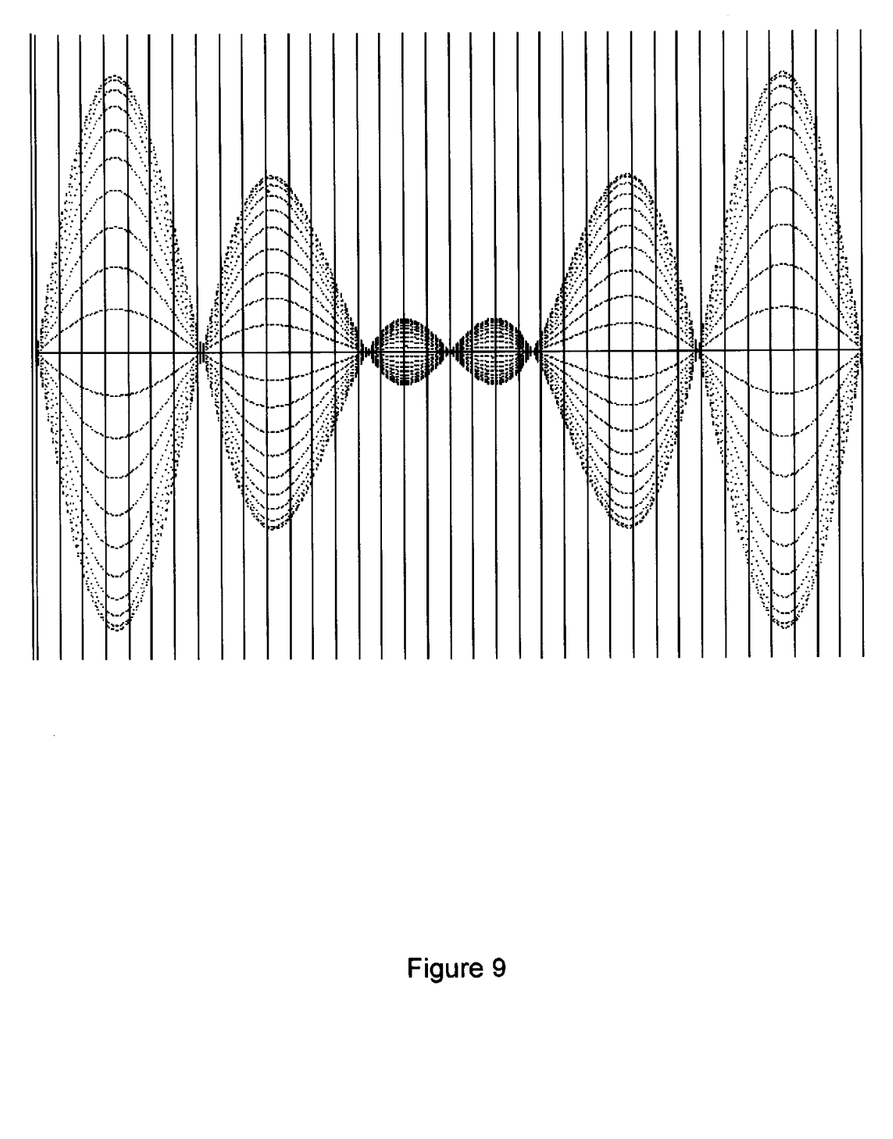
FIG. 9 is the electric standing wave pattern produced by the waveform of FIG. 8 when resonating in a one wavelength long resonant cavity.

This motor does not require that the source of cavity excitation energy have a sinusoidal waveform. Non-sinusoidal waveforms may be used as well. Fourier's theorem for periodic functions tells us that arbitrary waveforms may be generated by the addition of multiple sinusoidal and cosinusoidal waves. For example, FIG. 6 shows the waveform which results if equal amplitudes of a first and third harmonic are combined together. When this energy is applied to a cavity which one wavelength long at the first harmonic, the electric field standing wave pattern of FIG. 7 is produced in the cavity. If the cavity is considered to be 360 degrees in length, exciter structures may be used at the 35, 145, 215 or 325 degree points in the cavity; the peak electric field standing wave amplitudes. While propellor structures could be used at the 90, 180, and 270 degree points in the cavity; the null electric field standing wave amplitudes; the maximas of the magnetic field standing wave amplitudes. Other non-harmonic ratios of frequencies may be used in a similar fashion as shown in FIG. 8. The electric field standing wave pattern produced by the waveform of FIG. 8 is shown in FIG. 9. The same logic applies to choosing the exciter and propellor positions; exciters at the points of peak electric field standing wave amplitude; propellors at the nulls. An infinite number of combinations of multiple frequencies of various amplitudes may be used in this type of motor to excite the cavity. Further, the propellor or propellers can use the same frequency combinations and amplitudes as the excitation energy, or differing combinations to get maximum force from the motor design.

A critical factor in the successful design of this type of motor is to maintain strict phase control between the peak magnetic field standing wave energy surrounding the propellor structures and the maximum amplitude of the propellor current. If the same waveform is used to excite the cavity and drive the propellor currents, then phase control can be easily maintained by a combined fixed length of coaxial cable between the propellor and exciter structures as in FIG. 10. The fixed length of the transmission line determines the phasing between the propellor wire and the exciter antenna. This is easy and economical in a mass production environment once the proper length has been determined. Another possibility is to use a phase shifter between the propellor wire and exciter and to adjust the phase so that maximum force is produced by the motor. Another means of controlling the phase is by using lumped electrical components such as fixed and variable capacitors and inductors. In the case where the excitation and propellor are driven by independent sources, a means of accurately controlling the phase may be required. FIG. 10 is not intended to imply that the only configuration of propellor and exciter are driven in this manner. The propellor and exciter may be driven by completely independent generators and amplifiers and a separate means of phase control may be required. A design for this motor could also a include a means of variable phasing between the cavity's magnetic field standing wave energy and the propellor wire current. The ability to quickly switch the phasing yields a motor which may be quickly reversed. This feature could be used for braking action.

Engineering literature is filled with techniques for designing impedance matching and transformation circuits and components. Any of these techniques may be used. The need for impedance matching is to attempt to maximize the transfer of energy out of the generator. The optional impedance transformers are used to attempt to create the highest possible propellor current.

The transmission lines which convey power between the various components have been described as being of the coaxial variety. However, any type of transmission line is capable of serving the purpose as long as the impedance of the line and power handling ability match the application. Coaxial line is very common and has the benefit that there is minimal leakage of electromagnetic fields from the motor area.

Figure 1:
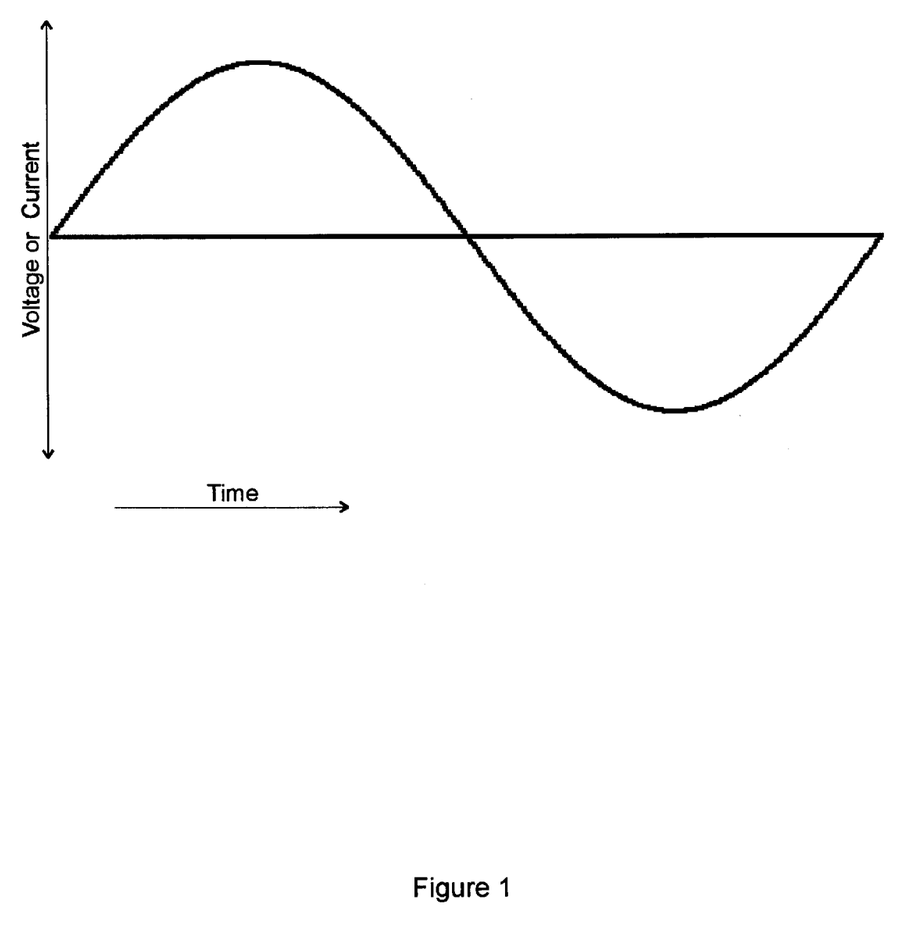
FIG. 1 is a representation of a typical sinusoidal radio frequency (RF) signal used in the invention.
Figure 2:
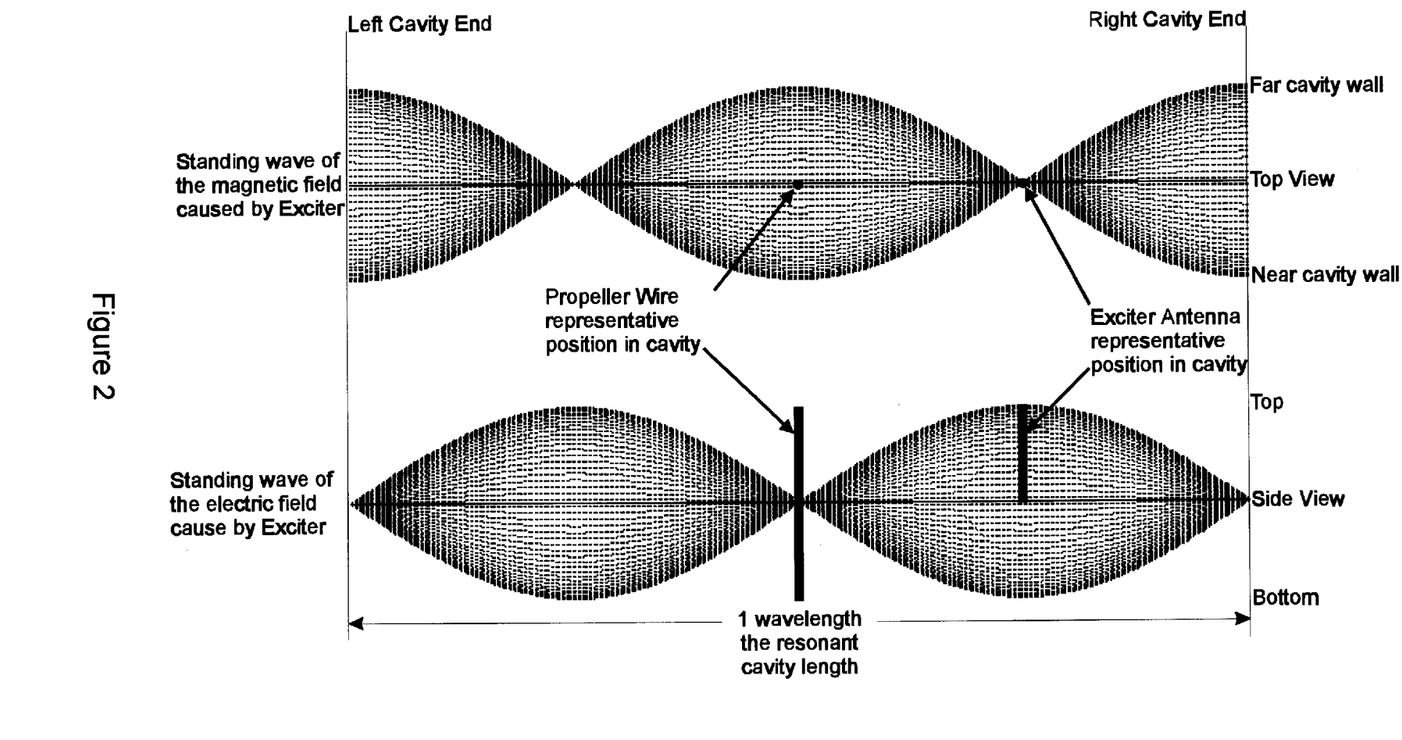
FIG. 2 is a standing wave pattern of electric and magnetic fields of the waveform shown in FIG. 1 applied to an exciter antenna, resonating in a one wavelength long resonant cavity.
Figure 3:
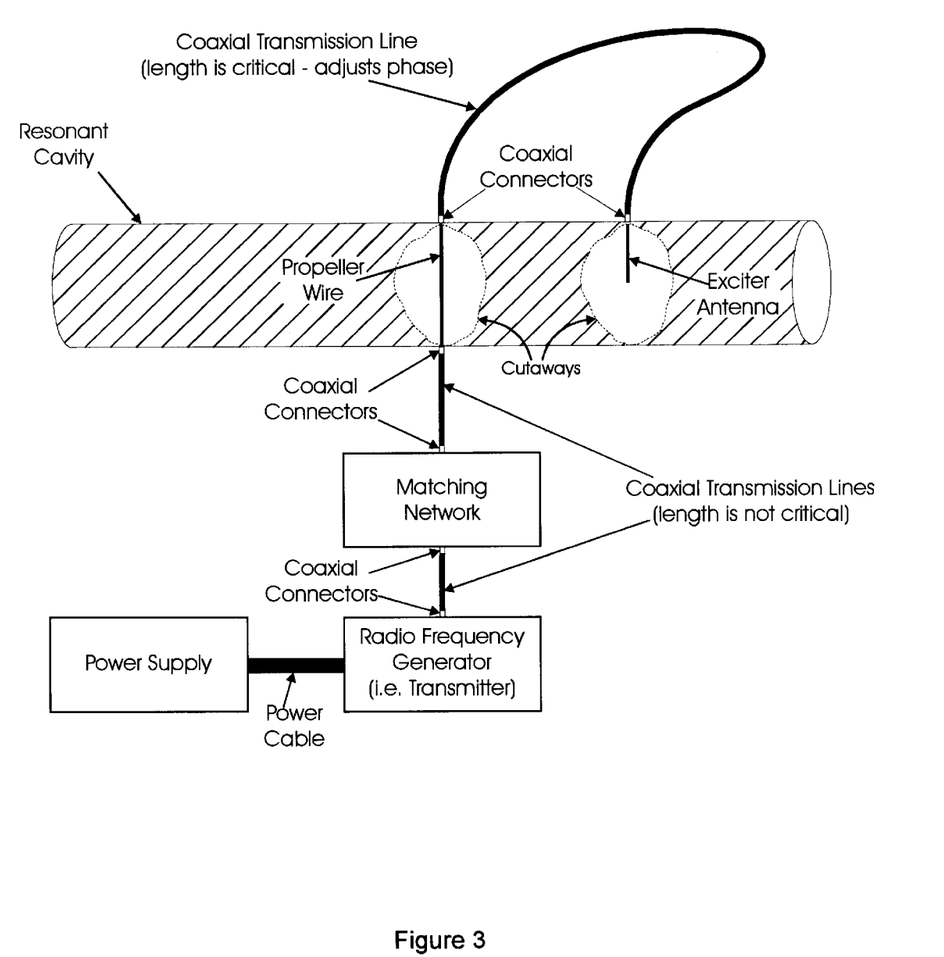
FIG. 3 is a more detailed schematic of the resonant cavity in relation to components for creating the motive effect of a linear force motor.

While coaxial cable connectors are shown in FIG. 3 and FIG. 10, connectors may in fact not be required if the motor components and drive circuits are co-located; the various parts could simply be fastened together. And in this light, it is possible that separate transmission lines and connectors could be completely eliminated from a motor design.

Since these motors can be completely sealed, they can be operated in hostile or dangerous environments. If they are small, they could be used inside the human body or in animal bodies for the purpose of repairing internal structures, attacking cancer cells, cleaning out arterial blockages, etc. They could also be used without degradation in high radiation, or chemical environments as long as the control and power generation system is protected.

Since there are no moving parts, no lubrication or maintenance is required whatsoever. However, periodic inspections may still be required if the motor is susceptible to damage from outside sources. Generally there is nothing to wear out so no parts need to be replaced. Also, since there are no moving parts, there is no upper speed limit to the device except that of light speed which in practical terms is never an issue.

Since the motor is substantially sealed electric and magnetic fields are not emitted from the motor. Careful design insures that this feature is maintained.

The control system for this motor includes a means for controlling the phasing and amplitude of signals to the excitation and propulsion structures. The overall force and direction of the motor should be controllable by this system. The control system should be stable and not produce sudden fluctuations in power applied to the motor. Sudden fluctuations could cause undesirable vibrations which are a feature of conventional motors. This motor should not vibrate and should not create any noise when operating as long as the control system provides stable power to the motor.

There are a multiply infinite number of ways that such a motor can be constructed, but all with the basic principle of attempting to create a very strong magnetic fields around current carrying conductors (propellors). The above-described variations are certainly not a conclusive list. Many variations of design are possible with this type of motor. A key element is that the motor functions from radiated electromagnetic waves which impinge upon a current carrying conductor. Since this might be taken to describe all existing conventional motors, since they operate on radiated magnetic fields, this invention is further distinguished by the fact that the motive force is not required to be transmitted through the use of moving parts. That is not to say that such a motor design could not contain a moving part, only that no moving parts are "required" in order to generate force and thus the possibility of useful mechanical work.

Many other forms of this invention exist, each differing from the other in matters of detail only. It is to be understood that the foregoing description and accompanying drawings set forth preferred embodiments of the invention at the present time. Various modifications, additions and alternative designs will, of course, become apparent to those skilled in the art in light of the foregoing teachings without departing from the spirit and scope of the disclosed invention. Therefore, it should be appreciated that the invention is not limited to the disclosed embodiments but may be practiced within the fall scope and spirit of the appended claims.

What is claimed is:

1. A system of generating a motive force without using moving motor parts or the expulsion of matter, and which can produce at least one of linear mechanical force or rotary mechanical force, and causing a motion in at least one of a linear or rotary direction, comprising:
    a) an electromagnetic resonant cavity;
    b) means of injecting electromagnetic energy into the resonant cavity to set up and maintain a standing electromagnetic wave inside the resonant cavity;
    c) a stationary force-producing electrically conducting element which when surrounded by a impinging magnetic field from the electromagnetic standing wave, and when passing an alternating electric current, produces a magnetically derived Lorentz force; and
    d) means of producing and passing an electric current through the electrically conducting element.

2. A system according to claim 1, wherein electromagnetic resonant cavity is of a selected geometric shape, resonates in a selected mode, is of a selected physical size, is of a size of any number of whole or partial wavelengths long, wide or deep, and is of a selected material including superconducting materials.

3. A system as claimed in claim 1, wherein the resonant cavity is filled with a selected medium, selectively a dielectric material to enhance the motive force production.

4. A system according to claim 1, wherein the means of injecting electromagnetic energy into the resonant cavity for the purpose of setting up and maintaining a standing electromagnetic wave includes selectively probes, loops or apertures to feed electromagnetic energy into the resonant cavity.

5. A system according to claim 1, wherein the force-producing element is a selected geometric shape, a selected size, is made of a selected material or superconducting material, and preferably is surrounded by a strongest portion of the magnetic standing wave inside the resonant cavity.

6. A system according to claim 1, wherein the means of producing and passing electric current through the force-producing element portion is selectively a radio-frequency generator and amplifier designed to match the resonant cavity.

7. A system according to claim 1, wherein the resonant cavity is structured to be excited by a waveform of a sinusoidal shape or a non-sinusoidal shape.

8. A system according to claim 1, comprising multiple elements a), b), c) or d).

9. A system according to claim 1, wherein the elements b) and c) are essentially the same structure.

10. A system according to claim 1, wherein the resonant cavity is a chamber for partly or completely sealing the system.

11. A system according to claim 1, including components to permit operation in a temperature range from near absolute zero to about the melting temperature of the materials of the cavity.

12. A system according to claim 1, wherein the excitation waveform does not match the current waveform of the electrically conducting element.

13. A system according to claim 1, wherein the excitation frequency does not match the current frequency of the electrically conducting element.

14. A system according to claim 1, wherein the excitation method and the force-producing structure are substantially the same.

15. A system of claim 1, comprising control for at least one of the frequency, waveform, amplitude and phasing applied to the excitation means.

16. A system as claimed in claim 15, wherein the outputs of the frequency, waveform, amplitude and phasing are stable and change smoothly in response to control inputs dictate.

17. A system according to claim 15, including a feedback path from an optional port in the resonant cavity to provide a self-tuning frequency control, selectively an oscillator which uses the resonant cavity as a tuned circuit.

18. A system of generating a motive force comprising:

an electromagnetic resonant cavity;

means of injecting electromagnetic energy into the resonant cavity to set up and maintain a standing electromagnetic wave inside the resonant cavity;

a stationary force-producing electrically conducting element which when surrounded by a impinging magnetic field from the electromagnetic standing wave, and when passing an alternating electric current, produces a magnetically derived Lorentz force;

means of producing and passing an electric current through the electrically conducting element; and wherein the resonant cavity being of a selected material including a superconducting material, and is filled with a selected medium, selectively a dielectric material, and the means of injecting electromagnetic energy into the resonant cavity for the purpose of setting up and maintaining a standing electromagnetic wave includes selectively probes, loops or apertures to feed electromagnetic energy into the resonant cavity.

19. A system of generating a motive force comprising:

an electromagnetic resonant cavity;

means of injecting electromagnetic energy into the resonant cavity to set up and maintain a standing electromagnetic wave inside the resonant cavity;

a stationary force-producing electrically conducting element which when surrounded by a impinging magnetic field from the electromagnetic standing wave, and when passing an alternating electric current, produces a magnetically derived Lorentz force;

means of producing and passing an electric current through the electrically conducting element, and wherein the force-producing element is a selected geometric shape, and preferably is surrounded by a strongest portion of the magnetic standing wave inside the resonant cavity; and wherein the means of injecting electromagnetic energy into the resonant cavity for the purpose of setting up and maintaining a standing electromagnetic wave includes selectively probes, loops or apertures to feed electromagnetic energy into the resonant cavity.

* * * * *